(12) United States Patent
Richter

(10) Patent No.: US 10,859,060 B2
(45) Date of Patent: Dec. 8, 2020

(54) HYDROELECTRIC POWER PLANT HAVING AN ELECTRICAL DRIVE FOR ACTUATING THE INLET VALVE

(71) Applicant: VOITH PATENT GMBH, Heidenheim (DE)

(72) Inventor: Peter Richter, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/631,262

(22) PCT Filed: Jul. 11, 2018

(86) PCT No.: PCT/EP2018/068753
§ 371 (c)(1),
(2) Date: Jan. 15, 2020

(87) PCT Pub. No.: WO2019/020372
PCT Pub. Date: Jan. 31, 2019

(65) Prior Publication Data
US 2020/0217294 A1    Jul. 9, 2020

(30) Foreign Application Priority Data

Jul. 27, 2017   (DE) .......................... 10 2017 116 968

(51) Int. Cl.
*F03B 15/00* (2006.01)
*F03B 13/08* (2006.01)
(Continued)

(52) U.S. Cl.
CPC .............. *F03B 15/00* (2013.01); *F03B 13/08* (2013.01); *F16K 31/043* (2013.01);
(Continued)

(58) Field of Classification Search
CPC ...... F03B 15/00; F03B 13/08; F16H 25/2204; F16H 25/2252; F16H 25/2454; F16H 2025/2075; F16K 31/047; Y02E 10/22
See application file for complete search history.

(56) References Cited

U.S. PATENT DOCUMENTS 1,273,704 A  *  7/1918  White ..................... F03B 17/00
                                                                   60/325
3,163,118 A  *  12/1964 Baumann ............... F03B 15/005
                                                                   60/398
(Continued)

FOREIGN PATENT DOCUMENTS

CN         2009946714 Y    9/2007
CN         102155544 A     8/2011
(Continued)

*Primary Examiner* — Tulsidas C Patel
*Assistant Examiner* — Joseph Ortega
(74) *Attorney, Agent, or Firm* — Laurence A. Greenberg; Werner H. Stemer; Ralph E. Locher

(57) ABSTRACT

A hydroelectric power plant includes an upper water basin, a lower water basin, a waterway connecting the upper water basin to the lower water basin, a hydraulic machine disposed in the waterway, an inlet valve disposed in a pressure pipeline, and an electric drive for actuating the inlet device. The electric drive is configured in such a way that it ensures reliable closing of the inlet valve even in the event of a power failure, without an emergency power supply being provided therefor.

9 Claims, 3 Drawing Sheets

(51) Int. Cl.
*F16K 31/04* (2006.01)
*F16H 25/22* (2006.01)
*F16H 25/24* (2006.01)
*F16H 25/20* (2006.01)

(52) U.S. Cl.
CPC ...... *F16H 25/2204* (2013.01); *F16H 25/2252* (2013.01); *F16H 25/2454* (2013.01); *F16H 2025/2075* (2013.01)

(56) References Cited

U.S. PATENT DOCUMENTS

| | | | | |
|---|---|---|---|---|
| 3,796,051 A * | 3/1974 | Kuwabara | ............... | F03B 15/06 60/398 |
| 4,120,602 A * | 10/1978 | Megnint | ................. | F03B 3/183 290/52 |
| 4,278,895 A * | 7/1981 | Cros | ..................... | F03B 13/08 290/52 |
| 4,408,452 A * | 10/1983 | Tsunoda | .................... | F03B 3/10 415/910 |
| 4,437,017 A * | 3/1984 | Osterberg | ............... | F03B 13/10 290/52 |
| 4,441,029 A * | 4/1984 | Kao | ........................ | F03B 13/08 290/52 |
| 4,475,334 A * | 10/1984 | Kuwabara | ............... | F03B 15/06 290/43 |
| 4,674,279 A * | 6/1987 | Ali | .......................... | F03B 15/14 290/43 |
| 4,794,544 A * | 12/1988 | Albright | ................. | F03B 15/06 290/43 |
| 4,941,771 A * | 7/1990 | Perper | ...................... | E02B 9/00 137/386 |
| 4,991,397 A * | 2/1991 | Varsa | ........................ | F03B 3/04 60/398 |
| 5,436,507 A * | 7/1995 | Brown | ...................... | F03B 15/06 290/43 |
| 5,754,446 A * | 5/1998 | Fisher, Jr. | ............... | F03B 15/12 290/40 R |
| 5,864,183 A * | 1/1999 | Fisher, Jr. | ............... | F03B 13/06 290/40 C |
| 5,997,242 A * | 12/1999 | Hecker | .................... | F03B 3/12 415/72 |
| 6,606,857 B1 * | 8/2003 | Simonds | ............... | F01C 21/089 290/54 |
| 6,748,967 B1 * | 6/2004 | Smiltneek | ............... | F16K 1/221 137/315.17 |
| 6,926,494 B2 * | 8/2005 | Sabourin | .................... | F03B 3/04 29/889.1 |
| 8,011,854 B1 * | 9/2011 | Millard | ................... | F15B 21/14 405/83 |
| 8,845,231 B2 * | 9/2014 | Holstein | ................. | E02B 9/022 405/78 |
| 8,857,166 B2 * | 10/2014 | Stummer | ................. | E02B 9/00 60/398 |
| 8,952,559 B2 * | 2/2015 | Holstein | ................. | F03B 3/12 290/52 |
| 9,623,523 B2 * | 4/2017 | Du | ......................... | B23P 19/04 |
| 2002/0125456 A1 * | 9/2002 | Rauch | .................. | F16K 31/003 251/337 |
| 2005/0062000 A1 * | 3/2005 | Bartell, Jr. | ............. | F16K 31/04 251/82 |
| 2006/0192162 A1 * | 8/2006 | Harvey | .................. | F16K 31/535 251/129.11 |
| 2008/0017817 A1 * | 1/2008 | Abram | .................. | F16K 31/043 251/79 |
| 2008/0048403 A1 * | 2/2008 | Oldberding | ........... | F16K 31/055 279/2.01 |
| 2008/0284174 A1 * | 11/2008 | Nagler | .................... | F03B 13/00 290/54 |
| 2009/0267350 A1 * | 10/2009 | McKie | .................... | F03B 13/00 290/54 |
| 2010/0140935 A1 * | 6/2010 | Paoli | ....................... | F03B 3/103 290/43 |
| 2010/0209192 A1 * | 8/2010 | Behm | ................... | F03B 13/086 405/87 |
| 2011/0074163 A1 * | 3/2011 | Timcang, Sr. | ........ | F03B 17/005 290/1 R |
| 2011/0089695 A1 * | 4/2011 | Krouse | ................... | F01D 15/10 290/52 |
| 2011/0204645 A1 * | 8/2011 | Jacobson | ................ | F03B 13/08 290/54 |
| 2011/0209784 A1 * | 9/2011 | Stein | ..................... | F16K 39/024 137/561 R |
| 2012/0039725 A1 * | 2/2012 | Carlos | .................... | F04D 25/04 417/53 |
| 2012/0068099 A1 * | 3/2012 | Sealy | ..................... | F16K 31/043 251/291 |
| 2012/0086204 A1 * | 4/2012 | Re | ........................... | F03B 13/00 290/43 |
| 2013/0025384 A1 * | 1/2013 | Coester | .................... | F16K 31/54 74/52 |
| 2014/0191509 A1 * | 7/2014 | Stauffer | ................. | F03B 17/04 290/54 |
| 2014/0197640 A1 * | 7/2014 | Barakat | .................... | F03B 13/08 290/54 |
| 2014/0197641 A1 * | 7/2014 | Barakat | .................... | F03B 13/06 290/54 |
| 2014/0216022 A1 * | 8/2014 | Jiang | ........................ | F15B 1/04 60/327 |
| 2014/0246859 A1 * | 9/2014 | Obermeyer | ........... | F03B 11/004 290/54 |
| 2015/0014995 A1 * | 1/2015 | Nishioka | ................ | F03B 17/06 290/52 |
| 2015/0204301 A1 * | 7/2015 | Williams | ............. | H02K 7/1807 290/52 |
| 2016/0084218 A1 * | 3/2016 | Obermeyer | ............... | F03B 3/04 415/1 |
| 2016/0169104 A1 * | 6/2016 | Rowe | .................... | F04D 27/023 251/129.12 |
| 2017/0089475 A1 * | 3/2017 | Tanner | ................. | F16K 31/047 |
| 2017/0110995 A1 * | 4/2017 | Gerwig | ................. | H02P 9/105 |
| 2017/0159840 A1 * | 6/2017 | Malik | ................. | F16K 27/029 |
| 2017/0284360 A1 * | 10/2017 | Jessamy | ................. | F03B 13/22 |
| 2017/0328491 A1 * | 11/2017 | Malik | .................... | F16K 31/44 |
| 2020/0141380 A1 * | 5/2020 | Lin | ....................... | F03B 11/002 |

FOREIGN PATENT DOCUMENTS

| | | |
|---|---|---|
| CN | 105626941 A | 6/2016 |
| JP | S5749959 U | 3/1982 |
| JP | S58127814 A | 7/1983 |
| JP | H02259283 A | 10/1990 |
| JP | H06085981 A | 12/1994 |
| JP | H0718404 U | 3/1995 |
| JP | H11107899 A | 4/1999 |
| JP | 2000130633 A | 5/2000 |

* cited by examiner

HYDROELECTRIC POWER PLANT HAVING AN ELECTRICAL DRIVE FOR ACTUATING THE INLET VALVE

BACKGROUND OF THE INVENTION

Field of the Invention

The present invention relates to a hydroelectric power plant having an electric drive for actuating the inlet valve, and a method for actuating such an inlet valve.

For safety reasons, most hydroelectric power plants have an inlet valve with the aid of which the plant can be safely shut down in the event of damage. Conventionally, such an inlet valve is actuated with the aid of a hydraulic servo motor and a hydraulic unit. This requires a large amount of hydraulic oil, which poses a risk to the environment. Drives for inlet valves of a hydroelectric power plant that are actuated electrically have been proposed to reduce this risk. JPH02259283 (A) thus discloses an electric drive for actuating the inlet valve of a hydroelectric power plant, said valve comprising an electric motor, a transmission, a spindle screw drive, a lever and a weight. The lever is connected to the axis of rotation of the inlet valve and carries a weight so that the inlet valve can be closed with the aid of the weight force. The electric motor is connected to the spindle screw drive via the transmission. The spindle screw drive engages the lever, so that the lever and the weight can be lifted with the aid of the electric motor and the inlet valve can thus be opened. Since the spindle screw drive has no self-locking, the weight, while closing, drives the motor via the spindle screw drive and the transmission, which in this case acts as a generator. The closing time of the inlet valve can thus be controlled via a switchable variable load resistor in order to avoid a pressure surge when the inlet valve closes. Furthermore, the arrangement also comprises a device for locking the inlet valve in the open position, which comprises a somewhat complicated mechanism which acts on the lever. The lock can be unlocked with the aid of an electromagnet. It is necessary for an electric current to flow through the electromagnet to do this. In the event of a power failure, this can be problematic, for example, batteries must be provided for this purpose, which in turn must be monitored so that closing can be carried out safely in any case.

SUMMARY OF THE INVENTION

The inventor has set himself the task of specifying an alternative electric drive for actuating the inlet valve of a hydroelectric power plant, which is of a simpler construction and reliably ensures closing of the inlet valve even in the event of a power failure, without batteries or the like having to be provided for this.

The inventor has recognized that the object can be achieved by a hydroelectric power plant having an upper water basin, a lower water basin, a waterway connecting the upper water basin to the lower water basin, a hydraulic machine disposed in the waterway and dividing the waterway into two parts, a pressure pipeline disposed between the upper water basin and the hydraulic machine, and an inlet valve disposed in the pressure pipeline, the inlet valve including a rotatably mounted valve body, a lever engaging the valve body, a weight disposed on the lever, an electrically activatable locking unit for locking the valve body and an electric drive, the drive being configured in such a way that it can open and close the inlet valve by lifting and lowering the weight, and the drive including a drive train having an electric motor, a transmission and a spindle screw drive in this order, disposed in such a way that the length of the drive can be varied by the operation of the motor to raise and lower the weight, the locking unit being integrated into the drive and configured in such a way that it can block the drive train when an electrical control signal is present and can release the drive train when no electrical control signal is present, and the drive further including a mechanical brake having adjustable braking force configured in such a way that it can engage the drive train in a restraining manner. Advantageous embodiments result from the dependent claims.

BRIEF DESCRIPTION OF THE SEVERAL VIEWS OF THE DRAWING

The solution according to the invention is explained below with reference to figures. The following is illustrated in detail.

DESCRIPTION OF THE INVENTION

Figure 1:
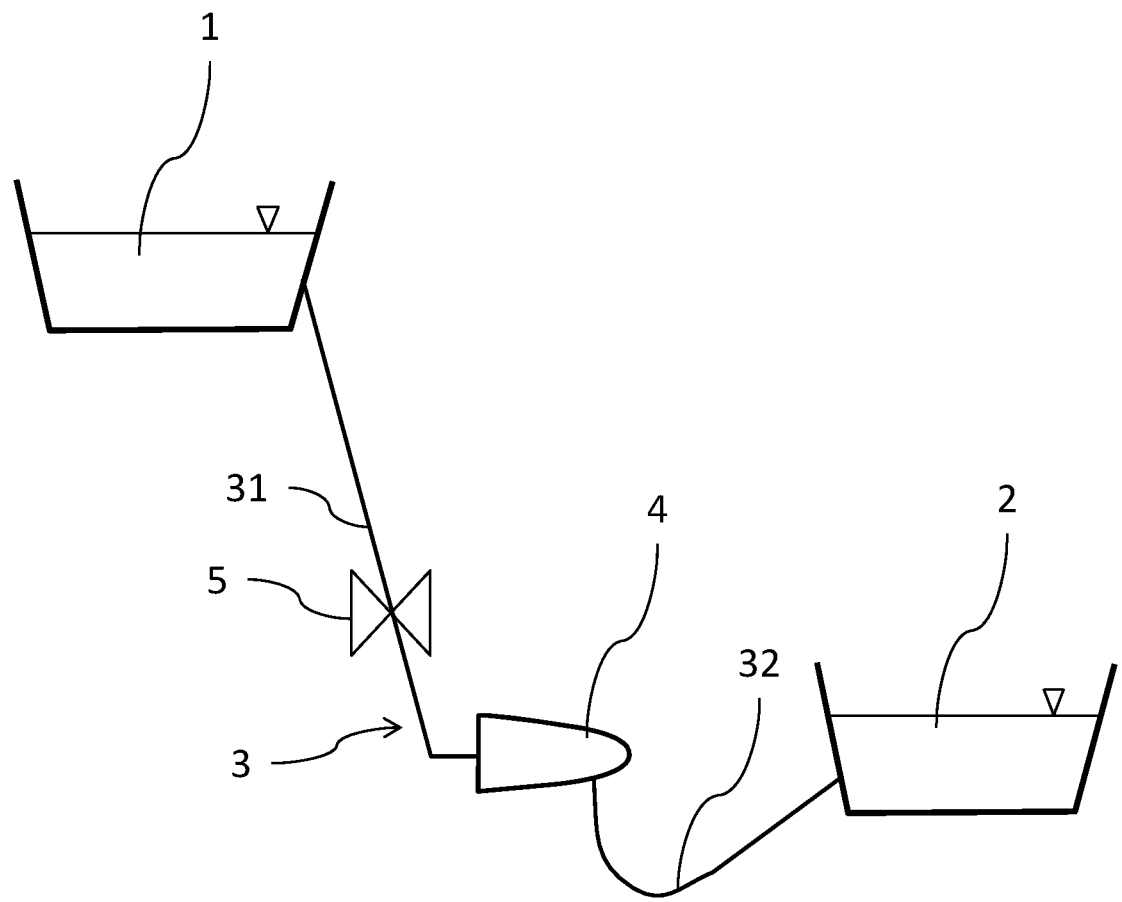
FIG. 1 hydroelectric power plant.

FIG. 1 shows the schematic structure of a hydroelectric power plant. The hydroelectric power plant comprises an upper water basin, which is designated by 1, and a lower water basin, which is designated by 2, wherein the water level in the upper water basin 1 lies above the water level of the lower water basin 2. Basins 1 and 2 can also be natural bodies of water such as lakes or rivers. The hydroelectric power plant further comprises a waterway, which is designated by 3 and connects the upper water basin 1 to the lower water basin 2. A hydraulic machine, which is designated by 4, is arranged in the waterway 3. This divides the waterway 3 into two parts. The part lying above the hydraulic machine 4—the pressure pipeline—is designated by 31, and the part lying below the hydraulic machine 4—the suction pipe—is designated by 32. The hydraulic machine 4 can be a turbine, a pump or a pump turbine. An inlet valve, which is designated by 5, is located in the pressure pipeline 31.

Figure 2:
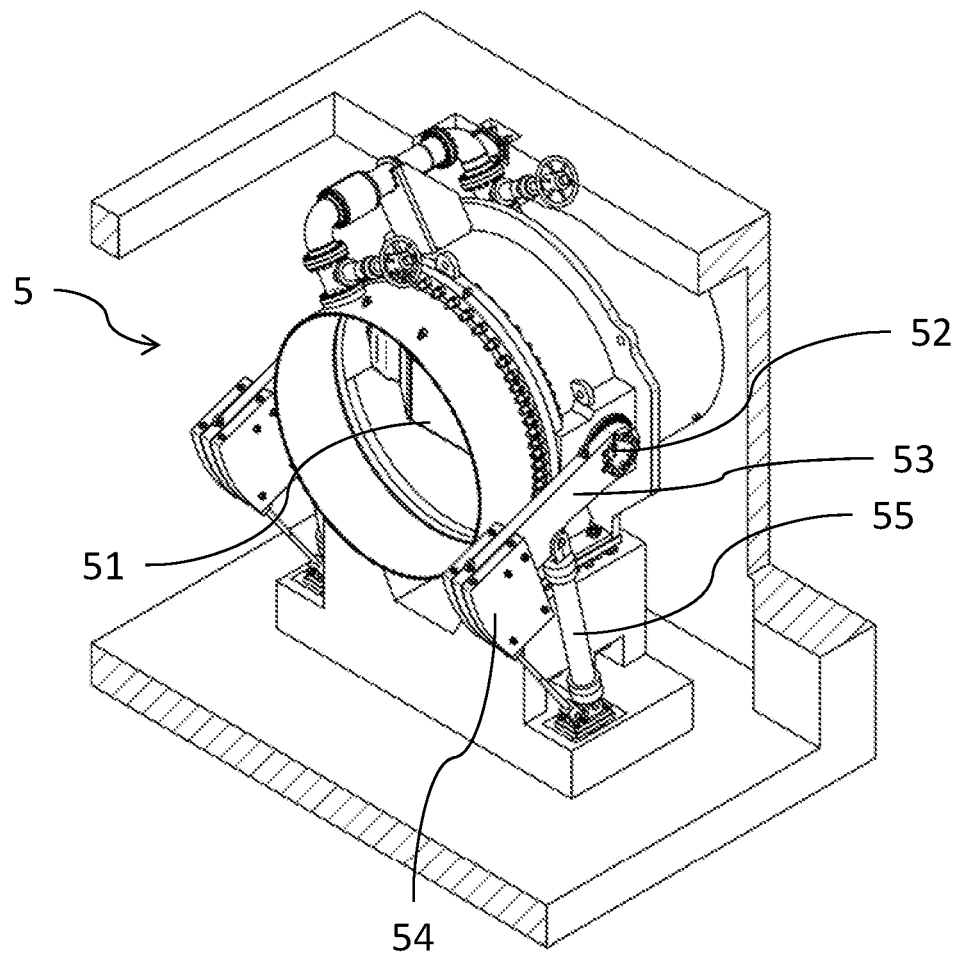
FIG. 2 inlet valve.

FIG. 2 shows an inlet valve 5. The inlet valve 5 comprises a valve body, which is designated by 51 and is rotatably mounted about an axis, which is designated by 52. The inlet valve 5 can be opened and closed by rotating the valve body 51 about the axis 52. For this purpose, the inlet valve 5 comprises at least one lever which engages the valve body 51 and is designated by 53. A weight is attached to the lever 53, which is designated by 54. Lever 53 and weight 54 are designed so that the inlet valve 5 can be safely closed solely by the weight force of the weight 54. Of course, it should be regarded as equivalent when the lever 53 is already designed so massively that no further weight 54 is necessary to close the inlet valve 5. The inlet valve 5 further comprises a drive for actuating the inlet valve 5, which is designated by 55. The drive 55 is designed and connected to the inlet valve 5 such that the weight 54 can be lifted by the drive 55 in order to open the inlet valve 5. In FIG. 2, the drive 55 engages the lever 53 for this purpose. However, it could also engage the weight 54. The drive 55 is designed such that it can change its length by moving in and out to actuate the inlet valve 5. In a first state—the retracted state—the drive 55 has a comparatively short length, so that the weight 54 can be lowered to such an extent that the inlet valve 5 is closed. In a second state—the extended state—the drive 55 has a comparatively large length, so that the weight is raised to such an extent that the inlet valve 5 is open.

Figure 3:
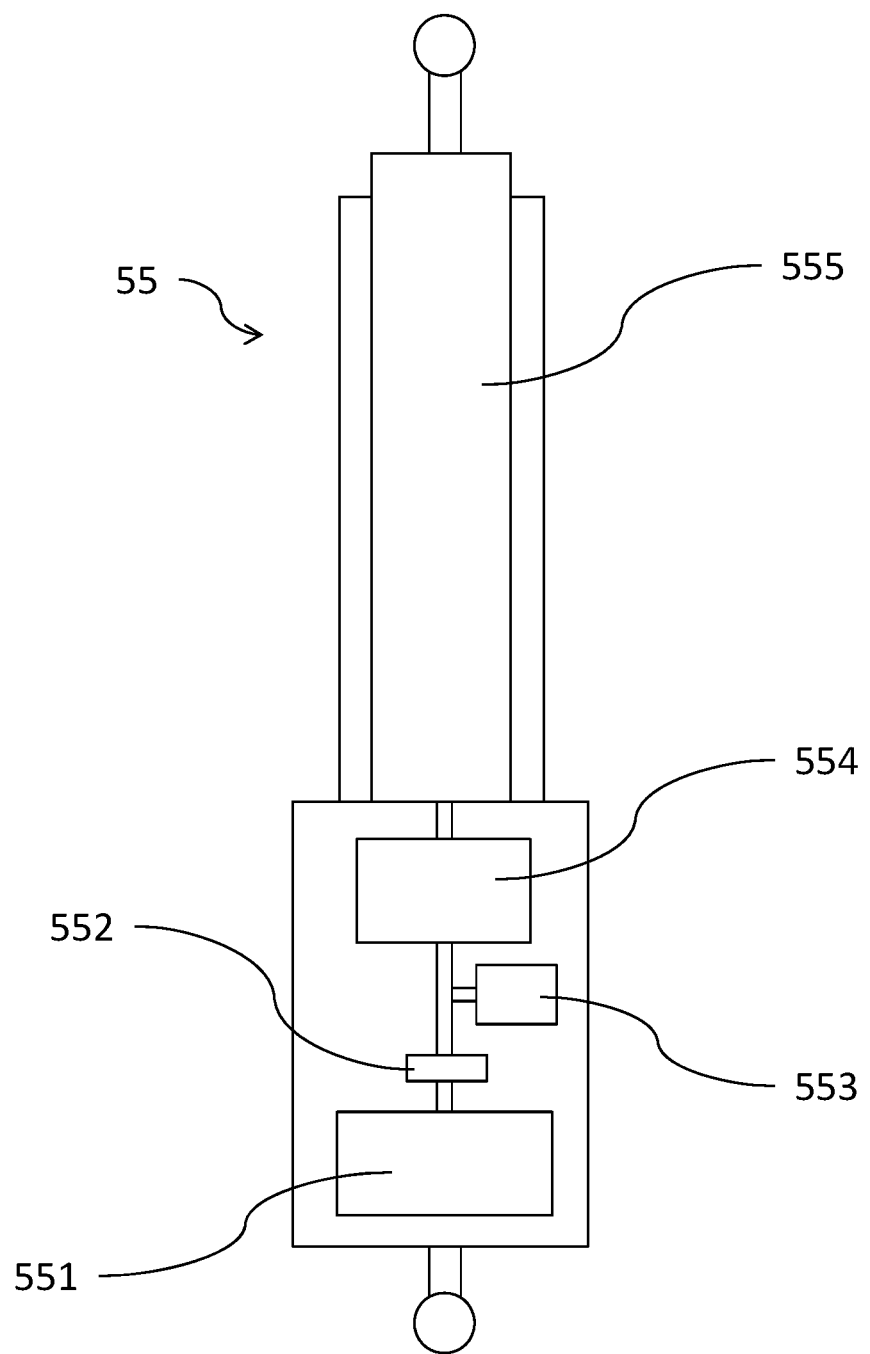
FIG. 3 drive according to the invention for actuating an inlet valve.

FIG. 3 shows a drive 55 according to the invention in a highly schematic manner. The drive 55 comprises an electric motor, which is designated by 551, a mechanical brake having adjustable braking force, which is designated by 552, a locking unit, which is designated by 553, a transmission, which is designated by 554, and a spindle screw drive without self-locking, which is designated by 555. The motor 551 is connected to the transmission 554 and the spindle screw drive 555 such that by rotating the motor 551, the spindle screw drive 555 can vary the length of the drive between the two suspension points, which are indicated by the two circles above and below in FIG. 3. Said components in this case are designed such that the force required to lift the weight 54 can be applied by the drive. The transmission 554 in this case will act in such a way that the rotary movement supplied by the motor 551—relatively high speed with relatively low torque—is transformed into a rotary movement with lower speed and higher torque and is transmitted to the spindle screw drive 555. Since the spindle screw drive 555 does not have self-locking, it is sufficient to disconnect the motor from the current or voltage to close the inlet valve. The mechanical brake 552 having adjustable braking force is used in this case to set the closing time of the inlet valve—the higher the braking force, the longer the closing time. The brake 552 is arranged such that it can restrain the rotational movement of the drive train within the drive 55. In order to fulfill this purpose, the brake 552 can be located at various points, for example, between the motor 551 and the transmission 552, as shown in FIG. 3, or between the transmission 554 and the spindle screw drive 555. It could also be integrated into the motor 551 or located within the transmission 554. However, it is advantageous when the brake 552 engages in a restraining manner at a point on the train which is located on the engine side of the transmission 554, since smaller braking forces are sufficient there to counteract the smaller torque there. The drive 55 further comprises an electrically activatable locking unit, which is designated by 553 and is designed such that, in a first state, it can completely prevent the rotary movement of the drive train and in a second state, it can completely release the rotary movement, wherein the first state is assumed when the locking unit 553 receives an electrical signal, and the second state is assumed when there is no electrical signal. What has been said regarding the brake 552 applies analogously to the position of the locking unit 553. There are many possible embodiments that are suitable for the locking unit 553. For example, it can be activatable brake, the braking force of which, in the closed first state, is so great that the weight force of the weight 54 is not sufficient to overcome the static friction of the brake. For example, it could be a pawl construction that engages with a corresponding gear wheel (for example, in the transmission) in order to completely prevent the rotational movement of the drive train. Or it could be a device having a retractable and extendable pin, which engages in a corresponding opening, for example, in the drive shaft of the train, as indicated in FIG. 3, or in a wheel of the transmission 554. The described mode of operation of the activation of the locking unit 553 can be achieved in this case, for example, by the interaction of electromagnets, permanent magnets and/or mechanical springs. The purpose of the locking unit 553 is that in the open state of the inlet valve 5, the drive 55 can be blocked so that the motor 551 can be switched off. Since the inlet valve 5 is in this state most of the time, energy can be saved, since the locking unit 553 consumes only a little electrical energy in the blocked first state. On the other hand, the switching logic described ensures that in the event of a power failure, the locking unit 553 assumes the second state and thereby releases the drive train, so that the inlet valve can close with the closing time set via the brake. In contrast to the drive known from JPH02259283(A), the drive of the present invention allows the valve body (51) to be locked in almost any rotational position thereof. For example, the inlet valve can also be blocked in the closed state, which increases safety during maintenance work, for example.

The time for opening is regulated by the rotary speed of the motor 551 when opening the inlet valve 5. As a rule, the motor 551 will run at constant speed in this case. If the brake 552 permanently engages the drive train in a restraining manner, the engine works against the braking force. Optionally, the energy consumption during opening can be reduced by electrically deactivating the brake 552 in a controlled manner, that is, in a first state, the brake 552 engages in the drive train with the preset braking force and in a second state, the brake 552 completely releases the drive train. In this case, the brake 552 is designed such that the second state is assumed when an electrical control signal is present, and the first state is assumed when no electrical control signal is present. This ensures that the inlet valve 5 can be reliably closed with the set closing time even in the event of a power failure. Alternatively, the brake 552 can also be designed such that it engages in a restraining manner only in one direction of rotation of the drive train. That is, only when the drive train rotates in the closing direction (wherein the weight 54 is lowered), does the brake 552 engage in the drive train in a restraining manner, and in the open direction (wherein the weight 54 is lifted), the drive train can rotate unhindered.

The closing of the inlet valve 5 can be accomplished in two ways. First, by switching off the power supply of the motor 551 with an active brake 552, or by retracting the spindle screw drive with the aid of motor 551. In both cases, the locking unit 553 must naturally release the drive train. In the second case, the closing time is regulated via the speed of the motor 551 and the brake 552 can possibly be deactivated in order to save energy.

It is clear from what has been said that the brake 552 can always be deactivated when the motor 551 is operating, that is, is under power. It is therefore particularly expedient when a brake 552, which may be controllable, is integrated into the motor 551, since the brake 552 can be controlled via the power supply to the motor 551. Fewer components are thus required and the structure of the drive is further simplified.

Ball screw drives or planetary roller screw drives can be used for the spindle screw drive 555, since these have no self-locking.

It should also be mentioned that the arrangement of the individual components in FIG. 3 is only to be understood as an example. For example, by using suitable bevel gears or the like, the drive train can be deflected and the length of the drive 55 can thus be designed shortened. However, there is always the following sequence in the drive train: motor 551, transmission 554, spindle screw drive 555.

The invention claimed is:
1. A hydroelectric power plant, comprising:
an upper water basin;
a lower water basin;
a waterway connecting said upper water basin to said lower water basin;
a hydraulic machine disposed in said waterway and dividing said waterway into two parts, one of said parts being a pressure pipeline disposed between said upper water basin and said hydraulic machine;

an inlet valve disposed in said pressure pipeline, said inlet valve including a rotatably mounted valve body, a lever engaging said valve body, a weight disposed on said lever, an electrically activatable locking unit for locking said valve body and an electric drive configured to open and close said inlet valve by lifting and lowering said weight;

said drive including a drive train having, in order, an electric motor, a transmission and a spindle screw drive, said drive having a length being variable by operation of said motor to raise and lower said weight;

said locking unit being integrated into said drive and configured to block said drive train when an electrical control signal is present and to release said drive train when no electrical control signal is present; and said drive including a mechanical brake having an adjustable braking force, said mechanical brake being configured to engage said drive train in a restraining manner.

2. The hydroelectric power plant according to claim 1, wherein said transmission has a motor side facing said motor, and said brake is disposed on said motor side of said transmission.

3. The hydroelectric power plant according to claim 1, wherein said transmission has a motor side facing said motor, and said locking unit is disposed on said motor side of said transmission.

4. The hydroelectric power plant according to claim 1, wherein said brake is configured to be electrically activatable, said brake has a first state in which said brake engages in said drive train in a restraining manner with a preset braking force and a second state in which said brake completely releases said drive train, said second state being assumed when an electrical control signal is present and said first state being assumed when no electrical control signal is present.

5. The hydroelectric power plant according to claim 1, wherein:

said drive train has a direction of rotation in which said inlet valve is closed and an opposite direction of rotation; and said brake is configured to only engage in said drive train in a restraining manner in said direction of rotation in which said inlet valve is closed and said drive train can rotate unhindered by said brake in said opposite direction of rotation.

6. The hydroelectric power plant according to claim 1, wherein said brake is integrated into said motor.

7. The hydroelectric power plant according to claim 1, wherein said locking unit is integrated into said transmission.

8. The hydroelectric power plant according to claim 1, wherein said spindle screw drive is a ball screw drive.

9. The hydroelectric power plant according to claim 1, wherein said spindle screw drive is a planetary roller screw drive.

* * * * *